(12) United States Patent
Wang

(10) Patent No.: US 10,317,601 B2
(45) Date of Patent: Jun. 11, 2019

(54) LIQUID CRYSTAL DISPLAY APPARATUS, BACKLIGHT MODULE BASED ON QUANTUM DOTS AND METHOD OF MANUFACTURING THE SAME

(71) Applicant: Shenzhen China Star Optoelectronics Technology Co., Ltd., Shenzhen, Guangdong (CN)

(72) Inventor: Yanan Wang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 276 days.

(21) Appl. No.: 15/116,905

(22) PCT Filed: Jul. 12, 2016

(86) PCT No.: PCT/CN2016/089709
§ 371 (c)(1),
(2) Date: Aug. 5, 2016

(87) PCT Pub. No.: WO2017/219397
PCT Pub. Date: Dec. 28, 2017

(65) Prior Publication Data
US 2018/0196182 A1    Jul. 12, 2018

(30) Foreign Application Priority Data
Jun. 23, 2016   (CN) .......................... 2016 1 0460776

(51) Int. Cl.
*F21V 8/00* (2006.01)

(52) U.S. Cl.
CPC .......... *G02B 6/0003* (2013.01); *G02B 6/0038* (2013.01); *G02B 6/0055* (2013.01); *G02B 6/0091* (2013.01)

(58) Field of Classification Search
CPC .. G02B 6/0003; G02B 6/0038; G02B 6/0091; G02B 6/0055
See application file for complete search history.

(56) References Cited

U.S. PATENT DOCUMENTS

| | | | |
|---|---|---|---|
| 2011/0176328 A1* | 7/2011 | Anandan | G02B 6/0036 362/606 |
| 2013/0194783 A1* | 8/2013 | Kang | G02B 6/0023 362/97.1 |

(Continued)

FOREIGN PATENT DOCUMENTS

| CN | 104296012 | 1/2015 |
|---|---|---|
| CN | 104344328 | 2/2015 |

(Continued)

*Primary Examiner* — Anh T Mai
*Assistant Examiner* — Fatima N Farokhrooz
(74) *Attorney, Agent, or Firm* — Andrew C. Cheng

(57) ABSTRACT

The present application discloses a liquid crystal display apparatus, a backlight module based on quantum dots and a method of manufacturing the same. Wherein the backlight module use the edge type structure and dispose the backlight source emitting monochromatic light in a side of the light guide plate, and formed a plurality of recessed portions on the lower surface of the light guide plate, the surface region of the recessed portions is coated the transparent dielectric layer doped with the dichroic quantum dots, a and metal reflecting layer successively.

10 Claims, 4 Drawing Sheets

(56) References Cited

U.S. PATENT DOCUMENTS

| | | | |
|---|---|---|---|
| 2014/0064660 A1* | 3/2014 | Huang | G02B 6/0036 385/31 |
| 2015/0192727 A1* | 7/2015 | Kuo | G02B 6/0036 349/65 |
| 2017/0199314 A1 | 9/2017 | Chen et al. | |

FOREIGN PATENT DOCUMENTS

| | | |
|---|---|---|
| CN | 105334668 | 2/2016 |
| CN | 105676341 | 6/2016 |
| JP | 2014235891 | 12/2014 |

* cited by examiner

__LIQUID CRYSTAL DISPLAY APPARATUS, BACKLIGHT MODULE BASED ON QUANTUM DOTS AND METHOD OF MANUFACTURING THE SAME__

FIELD OF THE INVENTION

The present application relates to a display technology field, and more particularly to a liquid crystal display apparatus, a backlight module based on quantum dots and a method of manufacturing the same.

BACKGROUND OF THE INVENTION

With advances in technology, the way of the display industry are becoming more diversified, thinner, more beautiful color, more realistic display, more widely used. Wherein the quantum dots, referred QDs is a kind of nanoscale materials, with concentrated emission spectrum, high color purity, and having the characteristics of the emission color of the light can be adjusted by simple size, structure or composition of the quantum dots material, these features of the quantum dots can be applied to the display device to effectively enhance the color gamut and color reproduction capability of the display device.

SUMMARY OF THE INVENTION

The present application provides a liquid crystal display apparatus, a backlight module based on quantum dots and a method of manufacturing the same. By using the quantum dots in the backlight module, makes the backlight module to realize the thin transparent display, and increase the color gamut and the display performance.

The first aspect of the present application is to provide a backlight module based on quantum dots, including a monochromatic light source and a light guide plate, the monochromatic light source is disposed at edge side of the light guide plate, wherein the lower surface of the light guide plate has a plurality of recessed portions, a transparent dielectric layer and a metal reflective layer are sequentially coated in the recessed portions, the transparent dielectric layer is doped with dichroic quantum dots, the wavelength of the light emitted from the monochromatic light source is different from the wavelength of the dichroic quantum dots.

Wherein the monochromatic light source is a blue light emitting diode, the dichroic quantum dots are the red quantum dots and the green quantum dots.

Wherein the lower surface of the light guide plate has a planar portion connected to the plurality of recessed portions.

Wherein planar portion is a transparent structure.

The second aspect of the present application is to provide a liquid crystal display apparatus including a display panel and a backlight module, wherein the backlight module including a monochromatic light source and a light guide plate, the monochromatic light source is disposed at edge side of the light guide plate, the lower surface of the light guide plate has a plurality of recessed portions, a transparent dielectric layer and a metal reflective layer are sequentially coated in the recessed portions, the transparent dielectric layer is doped with dichroic quantum dots, the wavelength of the light emitted from the monochromatic light source is different from the wavelength of the dichroic quantum dots.

Wherein the monochromatic light source is a blue light emitting diode, the dichroic quantum dots are the red quantum dots and the green quantum dots.

Wherein the lower surface of the light guide plate has a planar portion connected to the plurality of recessed portions and the planar portion is a transparent structure.

The third aspect of the present application is to provide a method of manufacturing a backlight module, including:

providing a light guide plate;

etching and patterning the lower surface of the light guide plate by a photoresist, and forming a plurality of recessed portions and a planar portion connected to the plurality of recessed portions;

coating a transparent dielectric layer doped with dichroic quantum dots on the surface region of the recessed portions and the planar portion;

depositing a metal reflective layer on the transparent dielectric layer; and removing the metal reflective layer and the transparent dielectric layer on the planar portion.

Wherein the method of manufacturing a backlight module, further including:

disposing a monochromatic light source in the edge of the light guide plate, the wavelength of the light emitted from the monochromatic light source is different from the wavelength of the dichroic quantum dots.

Wherein the monochromatic light source is a blue light emitting diode, the dichroic quantum dots are the red quantum dots and the green quantum dots.

By the approach described above, the advantage of the present application is, compared to the conventional technology, the liquid crystal display apparatus of the present application discloses the backlight module use the edge type light guide plate, the monochromatic light is disposed in a side of the light guide plate, by forming a plurality of recessed portions on the lower surface of the light guide plate, and the recessed portions is coated the transparent dielectric layer doped with the dichroic quantum dots, and a metal reflecting layer successively. By the method described above to optimize the structure of the light guide plate and realize the thin transparent display. The monochromatic light emitted from the monochromatic light source mixes with the dichroic quantum dots to emit white light. By using excellent light-emitting properties of the quantum dots to improve the wavelength distribution of the light emitted from the light guide plate, improves the color gamut of the display panel.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 1:
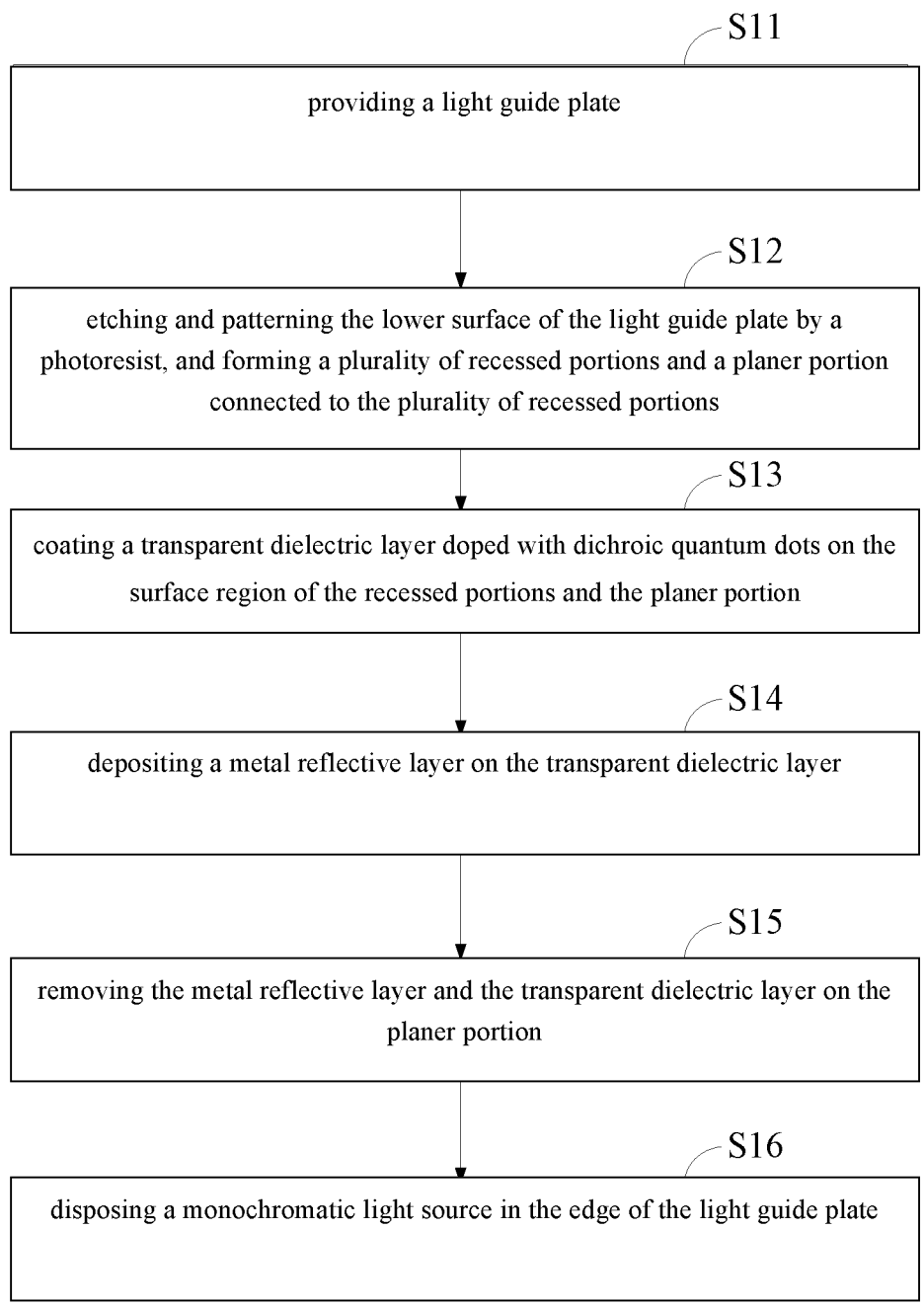
FIG. 1 illustrates a schematic flow of the steps of the method of manufacturing the backlight module of one embodiment of the present application.

Referring to FIG. 1, FIG. 1 illustrates a schematic flow of the steps of the method of manufacturing the backlight module of one embodiment of the present application. As illustrated in FIG. 1, the method of manufacturing the backlight module 10 of the present embodiment including:

S11: Providing a Light Guide Plate 100.

The light guide plate 100, LGP is by using the optical grade plate as acrylic (PMMA, methyl methacrylate) or PC (polycarbonate), mixing with a high-tech material with high reflectivity and without absorbing light printed the light guide points on the lower surface of the PMMA or PC plate.

S12: The Lower Surface of the Light Guide Plate 100 is Etched and Patterned by the Photoresist 105, a Plurality of Recessed Portion 101 and Planar Portions Connecting the Recessed Portion are Formed on the Lower Surface of the Light Guide Plate 100.

Figure 2:
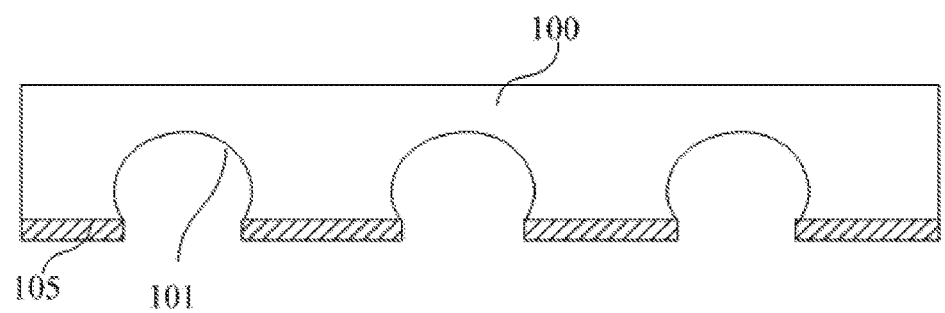
FIG. 2 illustrates a schematic structure of a plurality of recessed portion and planar portions formed on the lower surface of the light guide plate of the backlight module illustrated in FIG. 1.

A transparent layer of photoresist 105 is formed on the lower surface of the light guide plate 100 by spin coating or slit coating, and further using a mask (not shown) to perform the process of exposure and development to the photoresist 105. Wherein the mask includes a light transmitting portion and the opaque portion, and a light transmitting portion is disposed adjacent to the opaque portion, during the exposure process to the light guide plate 100 coated with the photoresist 105, the photoresist 105 corresponding to the light transmitting of the mask are performing the curing polymerization reaction under light irradiation, the photoresist 105 corresponding to the opaque portion of the mask is without the polymerization reaction and not cured under light irradiation. In the further developing process, the cured photoresist 105 will not be ashed, so as to be retained, and the uncured photoresist 150 will be ashed by the developing solution. And partial of the light guide plate 100 corresponding to the uncured photoresist 105 is also ashed by the developing solution, thereby forming the recessed portion 101 in interval and a planar portion 102 connected to the recessed portion 101, as illustrated in FIG. 2. And the outer surface of the planar portion 102 is also retained photoresist 105.

In other embodiments, the dry etching process may also be used in the lower surface of the light guide plate 100 to perform the patterning process to form a plurality of recessed portion 101 and the planar portion 102 connected to the recessed portion 101.

S13: Coating a Transparent Dielectric Layer 103 Doped with a Dichroic Quantum Dots 104 on the Surface Region of the Recessed Portion 101 and the Planar Portion 102.

The material of the transparent dielectric layer 103 is mixed by the red quantum dots 1041, the green quantum dots 1042 and the transparent medium 1031. In the present embodiment, after mixing the red quantum dots 1041, the green quantum dots 1042 and the transparent medium 1031, the transparent dielectric layer 103 doped with the red quantum dots 1041 and the green quantum dots 1042 are spin coating or slit coating on the surface region of the recessed portion 101 and the planar portion 102 of the lower surface of the light guide plate 100.

Since the light guide plate 100 has been patterned to form a plurality of recessed portion and the planar portion 102 connected to the recessed portion 101. Therefore, the thickness of the transparent dielectric layer 103 on the surface region of the recessed portion 101 is larger than the thickness of the transparent dielectric layer 103 on the planar portion 102, however, the recessed portion 101 is not completely filled with the transparent dielectric layer 103, those person skilled in the art can adjust the arc and the size of the recessed portion 101 by adjusting the thickness of the transparent dielectric layer 103 on the surface region of the recessed portion 101.

Figure 3:
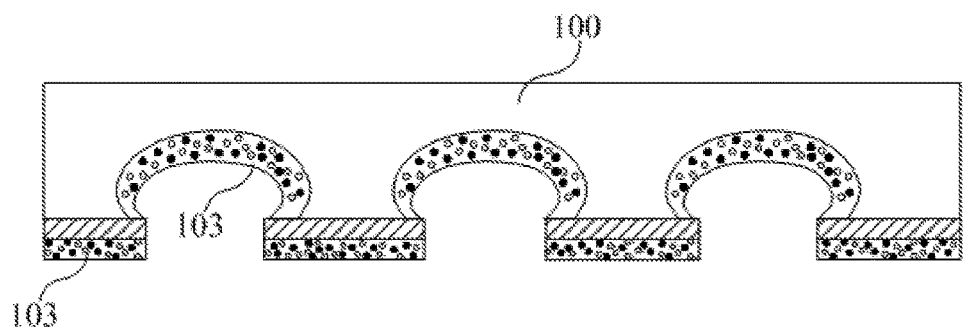
FIG. 3 illustrates a schematic structure of coating a transparent dielectric layer doped with a dichroic quantum dots in the plurality of recessed portion and planar portion illustrated in FIG. 2.

Wherein, the schematic structure of the patterned light guide plate 100 coating with a transparent dielectric layer 103 doped with the dichroic quantum dots layer 104 is illustrated in FIG. 3, wherein the photoresist 105 and the transparent dielectric layer 103 overlay sequentially on the planar portion 102, the photoresist 105 on the planar portion 102 is retained in the exposure and development process from the previous step. The surface region of the recessed portion is only with the transparent dielectric layer 103 on it.

S14: Depositing a Metal Reflective Layer 106 on the Transparent Dielectric Layer 103.

Figure 4:
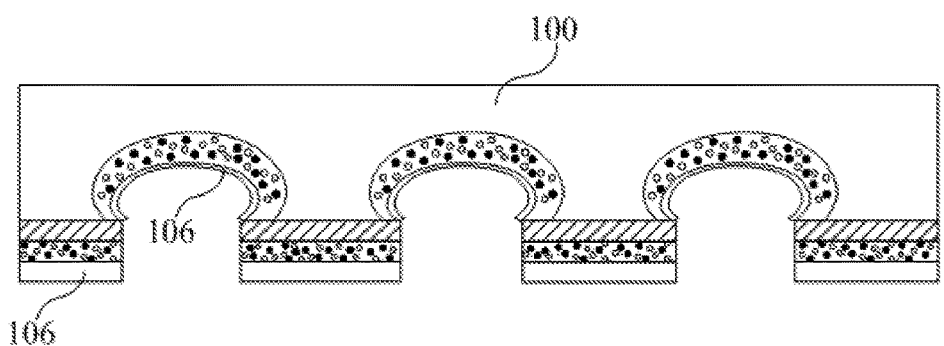
FIG. 4 illustrates a schematic structure of depositing a metal reflective layer on the transparent dielectric layer illustrated in FIG. 3.

The metal reflective layer 106 is further formed on the light guide plate 100 having the transparent dielectric layer 103 by physical vapor deposition method. Wherein the metal reflective layer 106 is covering on the transparent dielectric layer 103 of the surface region of the recessed portion 101 and is covering the transparent dielectric layer 103 of the planar portion 102. Wherein, a schematic diagram of the light guide plate 100 having metal reflective layer 106 vapor-deposited on the transparent dielectric layer 103 is illustrated in FIG. 4.

S15: Removing the Metal Reflection Layer 106 and the Transparent Dielectric Layer 103 on the Planar Portion 102.

The metal reflection layer 106 and the transparent dielectric layer 103 on the planar portion 102 is removed by using the etching processes subsequently, and further, in addition to remove the photoresist 105 on the planar portion 102, wherein the etching process adapted the conventional technology, not discussed here.

S16: Providing a Monochromatic Light Source 107 in the Side of the Light Guide Plate 100.

In the present embodiment, the backlight module 10 is manufactured by the vapor deposition process, is usually requires that the monochromatic wavelength of the light emitted from the monochromatic light source 107 is less than the wavelength of the transparent dielectric layer 103 doped quantum dots. For example, when the dichroic quantum dots 104 doped in the transparent dielectric layer 103 are the red quantum dots 1041 and the green quantum dots 1042, corresponding to the wavelength of the red quantum dots 1041 and the green quantum dots 1042, the monochromatic light source 107 is preferably a blue light emitting diode 107 (in the present application, the monochromatic light source and the blue light emitting diodes are uniformly marked as 107), which the wavelength of blue light is smaller than the wavelength of red light and green light. The blue light emitting diodes 107 is provided in the side of the light guide plate 100, therefore, the blue light emitted from the blue light emitting diodes 107 will excite the red quantum dots 1041 and the green quantum dots 1042, the blue light toward the metal reflective layer 106 and the transparent dielectric layer 103 of the light guide plate 100, the reflected light is mixed into a white light to emission, so that the monochromatic light source 107 of the backlight module 10 can take advantage of the superior light emitting performance of the quantum dots, and increase the color gamut of the display panel 20.

In other embodiments, the monochromatic light source 107 can be selected from a monochromatic light emitters with other wavelengths, the dichroic quantum dots 104 can be selected from the quantum dots having wavelengths different from the wavelength of the light emitted from the monochromatic light emitters, and by the step of forming the transparent dielectric layer 103 to dope the quantum dots with other wavelengths, and not be limited here. Preferably, the wavelength of the dichroic quantum dots 104 is larger than the wavelengths of light emitted by the monochromatic light emitter. For example, the monochromatic light source 107 can be selected a monochromatic violet light emitting diodes 107, the dichroic quantum dots 104 can be selected a yellow quantum dots and blue quantum dots, or the mix of the blue quantum dots red quantum dots and green quantum dots to match the wavelength emitted from the violet light emitting diode.

Figure 5:
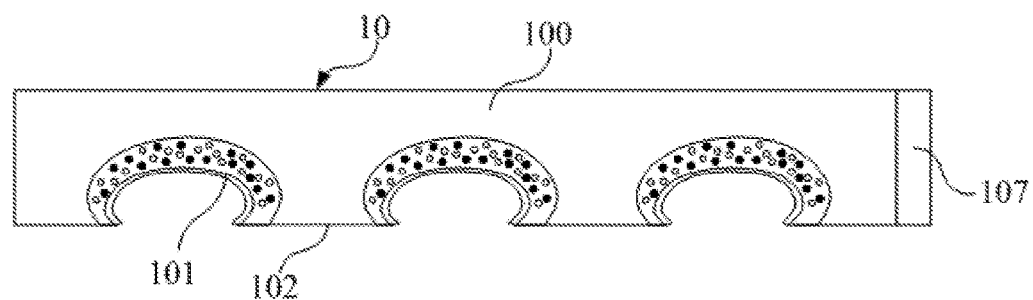
FIG. 5 illustrates a schematic structure of the backlight module based on quantum dots by the method of manufacturing illustrated in FIG. 1.
Figure 6:
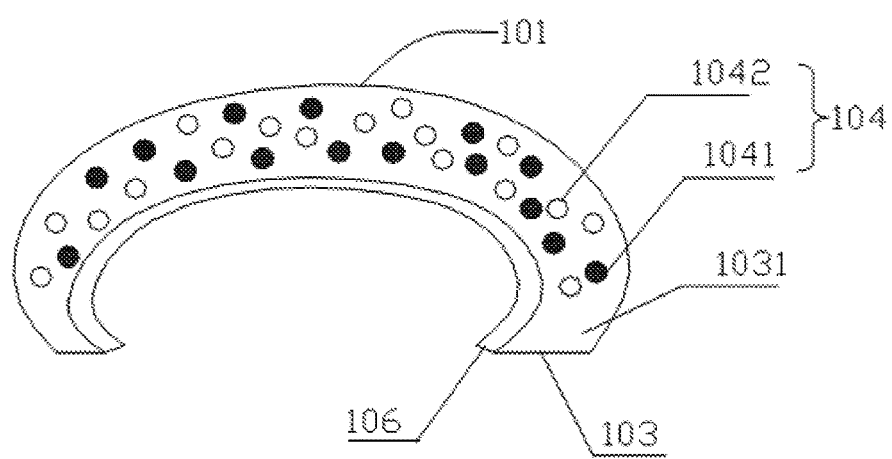
FIG. 6 illustrates a enlarged schematic structure of the recessed portion illustrated in FIG. 5.

The schematic structure of the backlight module based on quantum dots made by the method of manufacturing is illustrated in FIG. 5; the backlight module 10 includes a light guide plate 100 and a monochromatic light source 107, the monochromatic light source 107 is disposed at edge side of the light guide plate 100. Wherein the lower surface of the light guide plate 100 has a plurality of recessed portions 101 and the planar portion 102 connected to the recessed portions 101, the transparent dielectric layer 103 and the metal reflective layer 106 is sequentially coated in the recessed portions 101, the transparent dielectric layer 103 is doped with the dichroic quantum dots 104. In the present embodiment, the monochromatic light source 107 is preferably a blue light emitting diode 107, the dichroic quantum dots 104 doped in the transparent dielectric layer 103 is the red quantum dots and the green quantum dots corresponding to the blue light emitting diode 107, so that the blue light is emitted from the blue light emitting diode 107 toward the light guide plate 100, after the light passing the metal reflective layer 106 and the transparent dielectric layer 103, the light is mixed with the red quantum dots 1041 and the green quantum dots 1042 and emits white light, to achieve the superior luminescent properties of the quantum dots, improve the distribution of the wavelength from the light guide plate 100, to achieve the display performance of the high color gamut. Wherein the enlarge schematic structure of the recessed portion 101 is illustrated in FIG. 6.

In the present embodiment, the planar portion 102 is a transparent structure, which does not have reflective properties, the transparent and not reflective structure of the planar portion 102 can be applied in the condition of the low luminance of the monochromatic light source 107, or the light source is turned off, in can perform a transparent display by the use of ambient light. In addition, other optical components (not shown) is also provided in the light guide plate 100.

In other embodiments, if the selected source is a monochromatic light source 107, the monochromatic light source 107 can be selected as a light source with other wavelengths, the transparent dielectric layer 103 can dope the quantum dots with other wavelengths corresponding to the wavelengths emitted from the other light source. Usually, the wavelength of the light emitted by the monochromatic light source 107 is smaller than the wavelength of the light emitted from the excited quantum dots, such as the wavelength of the light emitted by the monochromatic light source 107 is smaller than the wavelength of the transparent dielectric layer 103 doped with the quantum dots. Further, to make the monochromatic light from the monochromatic light source mix with the light from the quantum dots and become a white light, the spectrum of the monochromatic light source and the spectrum of the quantum dots need to be complementary, so that the monochromatic light mix with the quantum dots and emit white light.

Figure 7:
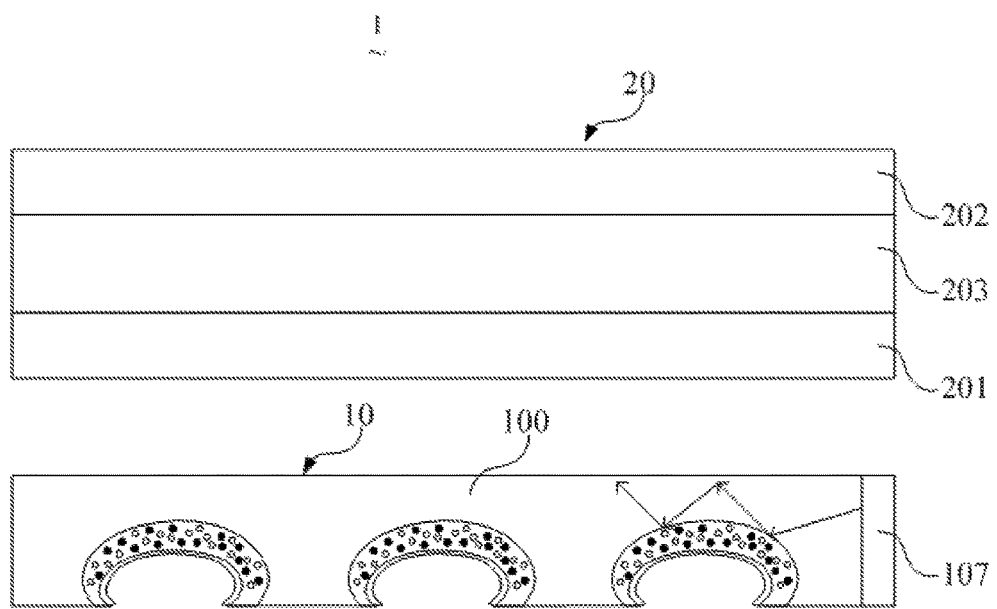
FIG. 7 illustrates schematic structure of a liquid crystal display apparatus of one embodiment of the present application.

Further referring to FIG. 7, FIG. 7 illustrates schematic structure of a liquid crystal display apparatus of one embodiment of the present application. As illustrated in FIG. 7, the liquid crystal display apparatus 1 of the present embodiment includes a display panel 20 and a backlight module 10, wherein the display panel 20 is a conventional liquid crystal display panel 20 includes an array substrate 201, a color filter substrate 202, and a liquid crystal layer 203 disposed between the two substrates, the backlight module 10 is the backlight module 10 of the embodiment described above, are not discussed here. The liquid crystal display apparatus 1 of the present embodiment can take advantage of the excellent light-emitting properties of quantum dots to improve the wavelength distribution of the light emitted from the light guide plate 100, makes the light emitted from the monochromatic light source 107 with higher color performance, and improves the color gamut of the display panel 20. And by the non-reflective transparent structure of the planar portion 102, it can be applied in the condition of the low luminance of the monochromatic light source 107 of the backlight module 10, or the light source is turned off, in can perform a transparent display by the use of ambient light to raise the utilization of light.

In summary, different from the conventional technology, the present embodiment provides the liquid crystal display apparatus, the backlight module based on quantum dots and the method of manufacturing the same. Wherein the backlight module use the edge type structure and dispose the monochromatic light source in a side of the light guide plate, and formed the plurality of recessed portions on the lower surface of the light guide plate, the surface region of the recessed portions is coated the transparent dielectric layer doped with the dichroic quantum dots, a and metal reflecting layer successively, so that the monochromatic light emitted from the monochromatic light source mixes with the dichroic quantum dots of the light guide plate to emit white light. By using excellent light-emitting properties of the quantum dots to improve the wavelength distribution of the light emitted from the light guide plate, improves the color gamut of the display panel.

Above are embodiments of the present application, which does not limit the scope of the present application. Any modifications, equivalent replacements or improvements within the spirit and principles of the embodiment described above should be covered by the protected scope of the invention.

What is claimed is:

1. A backlight module based on quantum dots, comprising a monochromatic light source and a light guide plate, the monochromatic light source is disposed at edge side of the light guide plate, wherein the lower surface of the light guide plate has a plurality of recessed portions, a transparent dielectric layer and a metal reflective layer are sequentially coated in the recessed portions, the transparent dielectric layer in each recessed portion is doped with dichroic quantum dots, the wavelength of the light emitted from the monochromatic light source is different from the wavelength of the dichroic quantum dots.

2. The backlight module based on quantum dots according to claim 1, wherein the monochromatic light source is a blue light emitting diode, the dichroic quantum dots are the red quantum dots and the green quantum dots.

3. The backlight module based on quantum dots according to claim 1, wherein the lower surface of the light guide plate has a planar portion connected to the plurality of recessed portions.

4. The backlight module based on quantum dots according to claim 3, wherein planar portion is a transparent structure.

5. A liquid crystal display apparatus comprising a display panel and a backlight module, wherein the backlight module comprising a monochromatic light source and a light guide plate, the monochromatic light source is disposed at edge side of the light guide plate, the lower surface of the light guide plate has a plurality of recessed portions, a transparent dielectric layer and a metal reflective layer are sequentially coated in the recessed portions, the transparent dielectric layer in each recessed portion is doped with dichroic quantum dots, the wavelength of the light emitted from the monochromatic light source is different from the wavelength of the dichroic quantum dots.

6. The liquid crystal display apparatus according to claim 5, wherein the monochromatic light source is a blue light emitting diode, the dichroic quantum dots are the red quantum dots and the green quantum dots.

7. The liquid crystal display apparatus according to claim 5, wherein the lower surface of the light guide plate has a planar portion connected to the plurality of recessed portions and the planar portion is a transparent structure.

8. A method of manufacturing a backlight module, comprising:
   providing a light guide plate;
   etching and patterning the lower surface of the light guide plate by a photoresist, and forming a plurality of recessed portions and a planar portion connected to the plurality of recessed portions;
   coating a transparent dielectric layer doped with dichroic quantum dots on the surface region of the recessed portions and the planar portion;
   depositing a metal reflective layer on the transparent dielectric layer; and
   removing the metal reflective layer and the transparent dielectric layer on the planar portion, wherein the transparent dielectric layer at each recessed portion has dichroic quantum dots.

9. The method according to claim 8, wherein the method further comprising:
   disposing a monochromatic light source in the edge of the light guide plate, the wavelength of the light emitted from the monochromatic light source is different from the wavelength of the dichroic quantum dots.

10. The method according to claim 9, wherein the monochromatic light source is a blue light emitting diode, the dichroic quantum dots are the red quantum dots and the green quantum dots.

* * * * *